United States Patent [19]

Radomski

[11] Patent Number: 4,686,442

[45] Date of Patent: Aug. 11, 1987

[54] DUAL VOLTAGE ELECTRICAL SYSTEM

[75] Inventor: Thomas A. Radomski, Utica, Mich.

[73] Assignee: General Motors Corporation, Detroit, Mich.

[21] Appl. No.: 856,769

[22] Filed: Apr. 28, 1986

[51] Int. Cl.[4] .............................................. H02J 7/00
[52] U.S. Cl. ...................................... 320/17; 320/19; 320/40; 320/42; 320/59; 322/90; 322/94
[58] Field of Search ....................... 320/15, 17, 19, 39, 320/40, 41, 42, 57, 59; 322/90, 94

[56] References Cited

U.S. PATENT DOCUMENTS

| | | | |
|---|---|---|---|
| 3,624,480 | 11/1971 | Campbell | 320/15 |
| 3,962,621 | 6/1976 | Raver | 320/15 |
| 4,047,088 | 9/1977 | Himmler | 320/17 |
| 4,179,647 | 12/1979 | Cummins et al. | 320/17 |
| 4,210,856 | 7/1980 | Taylor | 320/17 |
| 4,491,779 | 1/1985 | Campbell et al. | 320/17 |

Primary Examiner—Patrick R. Salce
Assistant Examiner—Anita M. Ault
Attorney, Agent, or Firm—C. R. Meland

[57] ABSTRACT

A dual voltage motor vehicle electrical system wherein a pair of batteries are connected in series across the direct voltage output terminals of a bridge rectifier that is connected to the output winding of an alternating current generator. First and second groups of controlled rectifiers are connected between a junction of the batteries and the generator output winding. In low speed operation of the generator the groups of controlled rectifiers are alternately biased conductive. The time period of conduction of the groups of controlled rectifiers is controlled as a function of the difference in the voltages across the respective batteries. At a higher speed of the generator one of the two groups of controlled rectifiers is biased conductive, dependent upon the relative magnitudes of the voltages across the batteries.

7 Claims, 2 Drawing Figures

DUAL VOLTAGE ELECTRICAL SYSTEM

This invention relates to a dual voltage electrical system and more particularly to a dual voltage electrical system for a motor vehicle.

Dual or multi-voltage electrical systems for motor vehicles are well known to those skilled in the art, an example being the system disclosed in the U.S. Pat. No. to Campbell et al. 4,491,779, granted on Jan. 1, 1985. In that patent a 12-24 volt electrical system is disclosed. That system has two 12 volt batteries which, during a so-called 24 volt charging mode, are charged in series from the direct voltage output terminals of a diode-rectified alternating current generator. In a so-called 12 volt charging mode only one of the batteries is charged by gating a group of controlled rectifiers conductive that are connected to the phase windings of the alternating current generator. The system responds to generator speed and when generator speed is below some predetermined speed the system is controlled to operate in the 12 volt mode where only one of the two batteries is charged. When generator speed is above the predetermined value the system is controlled to operate in the 24 volt mode. The generator is driven by the engine and the generator speed at which the system operates in the 12 volt mode corresponds to a low engine speed.

In contrast to the electrical system disclosed in the above-referenced Campbell et al. patent, it is an object of this invention to provide a dual voltage motor vehicle electrical system that has two batteries and an alternating current generator for charging the batteries and wherein both of the batteries are charged during a low speed condition of operation of the engine and generator. In carrying this object forward a three-phase alternating current generator is provided that feeds a three-phase full-wave bridge rectifier. The system also has two banks or groups of semiconductor switches which may be controlled rectifiers connected to the phase windings of the generator and when one bank of semiconductor switches is gated conductive one battery is charged from the generator and when the other bank of semiconductor switches is gated conductive the other battery is charged from the generator. The banks of semiconductor switches are alternately and sequentially gated conductive, that is, the sequence is such that a first bank is gated conductive, then the second bank is gated conductive and then the first bank is again gated conductive and so on. The time period that a given bank of semiconductor switches is gated conductive is controlled as a function of the relative magnitudes of the voltages across the batteries. The system operates such that when the time period of conduction of one group of semiconductor switches is increasing the time period of conduction of the other group of semiconductor switches is decreasing and vice versa. The system is arranged such that a constant frequency pulse width control is provided where the pulse width corresponds to the time period of conduction of a given bank or group of semiconductor switches.

Another object of this invention is to provide a dual voltage electrical system that utilizes banks of semiconductor switches which may be controlled rectifiers which, in response to generator speed exceeding a predetermined value, operates to select which group of semiconductor switches is to be gated conductive in order to provide additional charge to whichever battery is subjected to a heavier load. In this higher speed mode of operation the system charges both batteries in series using the aforementioned three-phase bridge rectifier and senses the relative magnitudes of the voltage across the batteries to select one of the two banks of semiconductor switches for conduction. The group of semiconductor switches that is selected and hence biased to conduct is the group that will cause the battery that has the lower voltage to receive additional charge.

IN THE DRAWINGS

Figure 1:
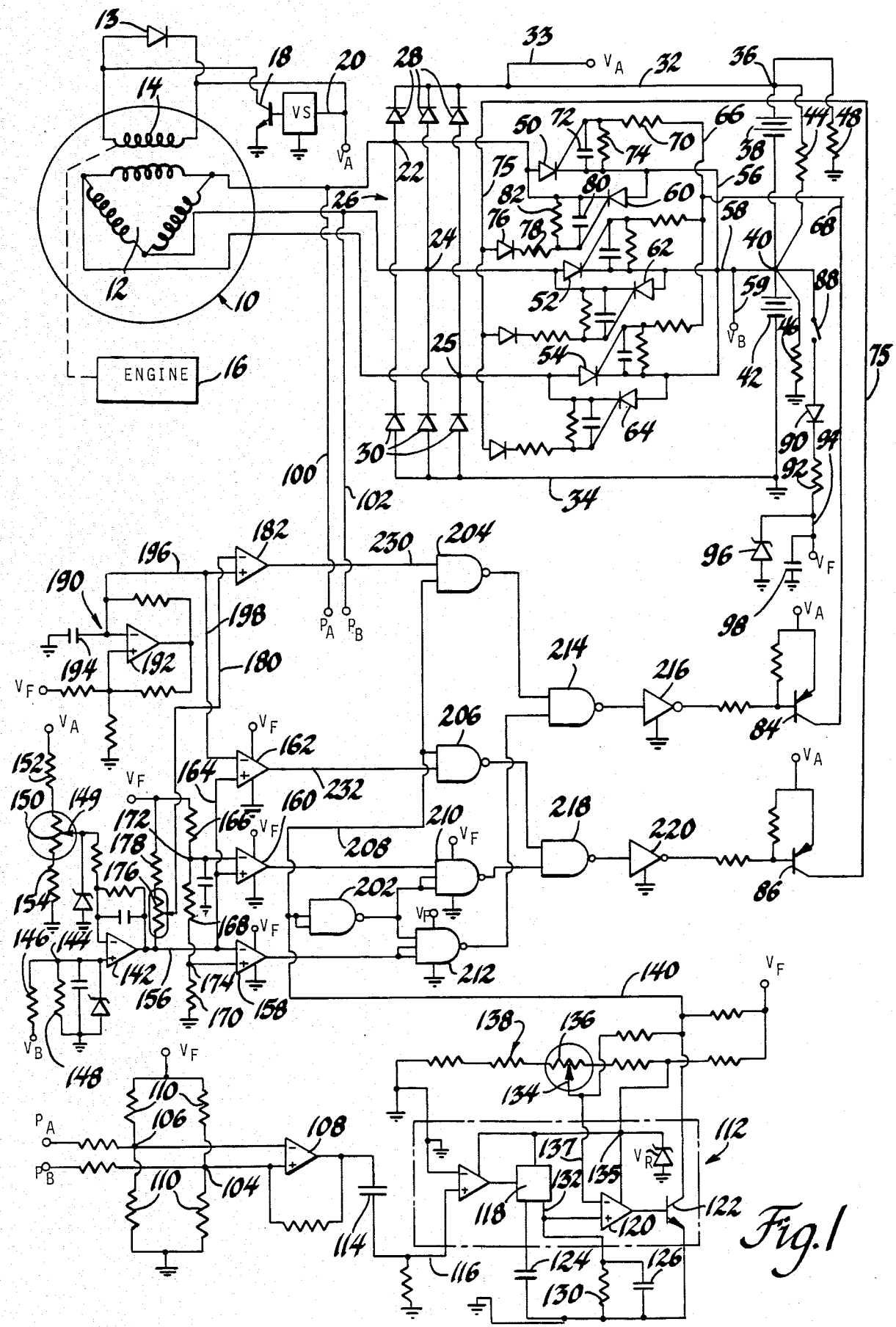
FIG. 1 is a schematic circuit diagram of a dual voltage motor vehicle electrical system made in accordance with this invention.

Referring now to FIG. 1 of the drawings, the reference numeral 10 designates an alternating current generator that has a three-phase Delta connected stator or output winding 12 and a field winding 14. The field winding 14 is carried by the rotor of the generator in a well known manner and the rotor is driven by an engine 16 of a motor vehicle through, for example, a belt and pulley arrangement which has not been illustrated.

The field winding 14 is connected to a voltage regulator that comprises an NPN transistor 18 connected in series with field winding 14 and a voltage sensing circuit VS coupled to the base of transistor 18. A field discharge diode 13 is connected across field winding 14. The voltage sensing circuit senses the voltage on conductor 20 which is connected to a node or junction $V_A$. Various other nodes or junctions are shown in FIG. 1 that are also identified as $V_A$ and all of these junctions, or nodes of like $V_A$ designation, are electrically connected by conductors that are not illustrated.

The phase windings of generator output winding 12 are connected to the AC input terminals 22, 24 and 25 of a three-phase full-wave bridge rectifier 26 comprised of three positive diodes 28 and three negative diodes 30. The cathodes of diodes 28 are connected to a power supply conductor 32 and the anodes of diodes 30 are connected to a power supply conductor 34 that is connected to ground. The conductor 32 is connected to a junction $V_A$ by conductor 33 and accordingly all junctions designated $V_A$ in FIG. 1 have the same voltage as the voltage on conductor 32.

The conductor 32 is connected to a junction 36. A 12 volt motor vehicle storage battery 38 is connected between junctions 36 and 40 and another 12 volt motor vehicle storage battery 42 is connected between junction 40 and ground. The circuit elements 44, 46 and 48, which are shown as resistors, represent motor vehicle electrical loads which are connected with suitable control switches that have not been illustrated. Loads 44 and 46 are so-called 12 volt loads since they are energized with 12 volts. Load 48 is a so-called 24 volt load since it is energized with 24 volts.

Returning now to the operation of the generator voltage regulator, the voltage sensing circuit VS senses the voltage appearing between conductor 32 and ground and controls the conduction of transistor 18 in accordance with the voltage that is sensed. In the foregoing description of this invention it has been assumed that batteries 38 and 42 are 12 volt batteries. Based on this, the voltage regulator can be arranged such that it controls field current so that the regulator maintains the voltage between conductor 32 and ground at a desired regulated value of about 29 volts. Thus, if the voltage appearing between conductor 32 and ground exceeds 29 volts the voltage regulator biases the transistor 18 nonconductive to cutoff field current. When the voltage between conductor 32 and ground now drops below the desired regulated value of 29 volts the transistor 18 is biased conductive to energize the field winding 14. The field winding 14 is energized with 24 volts since it is connected between junction $V_A$ and ground through the collector-emitter circuit of transistor 18.

The dual voltage electrical system has a first bank or group of three silicon controlled rectifiers 50, 52 and 54. The cathodes of these controlled rectifiers are all connected to a conductor 56 which in turn is connected to junction 40 via conductor 58. The anodes of controlled rectifiers 50-54 are connected respectively to the AC input terminals of the bridge rectifier 26 and hence to the phase windings of the output winding 12.

The dual voltage electrical system further has a second bank or group of three silicon controlled rectifiers 60, 62 and 64. The anodes of these controlled rectifiers are connected to conductor 56 while the cathodes of this group of controlled rectifiers are connected respectively to the AC input terminals of the bridge rectifier 26.

The gate bias circuit for controlled rectifiers 50-54 comprises a conductor 66 that is connected with a conductor 68. The gate electrode of controlled rectifier 50 is connected to conductor 66 via resistor 70. The gate of controlled rectifier 50 is also connected to a capacitor 72 and a resistor 74. The other two controlled rectifiers 52 and 54 are connected in the same fashion to conductor 68.

The gate electrodes of controlled rectifier 60, 62 and 64 are connected to a conductor 75. Thus, the gate of controlled rectifier 60 is connected to conductor 75 by a diode 76 and resistor 78. The gate of controlled rectifier 60 is also connected to capacitor 80 and resistor 82. The controlled rectifiers 62 and 64 are connected to conductor 75 by circuits that are identical with the one that has been described in connection with the gate electrode of controlled rectifier 60.

The conductor 68 is connected with the collector of a PNP transistor 84. The emitter of this transistor is connected to junction $V_A$ and hence to plus 24 volts. The conductor 75 is connected to the collector of PNP transistor 86. The emitter of this transistor is connected to junction $V_A$ and hence to plus 24 volts.

Whenever transistor 84 is biased conductive, a direct voltage is applied to the gates of controlled rectifiers 50, 52 and 54 to gate these controlled rectifiers conductive. When controlled rectifiers 50-54 are gated conductive the battery 42 is charged from a circuit that includes controlled rectifiers 50-54 and diodes 30. This circuit can be traced from the AC input terminals of bridge rectifier 26, through conducting controlled rectifiers 50-54, to conductor 56, through conductor 58 to junction 40, through battery 42 to conductor 34 and then through diodes 30 to the AC input terminals of bridge rectifier 26.

When transistor 84 is biased nonconductive there is no gate voltage applied to controlled rectifiers 50-54 and accordingly these controlled rectifiers are commutated to a nonconductive state.

Whenever transistor 86 is biased conductive a direct gate bias voltage is applied to the gates of controlled rectifiers 60-64 via line 75 and a respective diode such as diode 76. When controlled rectifiers 60-64 are biased conductive, the battery 38 is charged from the generator via a circuit that includes conducting controlled rectifiers 60-64 and diodes 28. This circuit can be traced from the AC input terminals of bridge rectifier 26, through diodes 28, through conductor 32 to junction 36, through battery 38 to junction 40 and then through conducting controlled rectifiers 60-64 to the AC input terminals of bridge rectifier 26. When transistor 86 is biased nonconductive no gate voltage is applied to controlled rectifiers 60-64 and accordingly these controlled rectifiers are commutated to a nonconductive state.

In the foregoing description of the conductive states of the groups of controlled rectifiers it has been pointed out that battery charging current is supplied to a given battery when a given group of controlled rectifiers is biased conductive. Current is also supplied to the respective loads 44 and 46 which are connected across batteries 38 and 42 and also to load 48 which is connected across the series connection of batteries 38 and 42.

The junction 40 which is connected to conductor 58 is also connected to a junction designated as $V_B$ by conductor 59. Various other junctions in FIG. 1 are designated as $V_B$ and all of these junctions are connected by conductors which have not been illustrated. The junction 40 is connected to a manually operable switch 88 which may be the ignition switch on a motor vehicle. The opposite side of the switch 88 is connected to a diode 90 which in turn is connected to a resistor 92. The opposite side of resistor 92 is connected to a junction identified as $V_F$ by conductor 94. The circuit of FIG. 1 has additional junctions identified as $V_F$ and all of these junctions of like designation $V_F$ are electrically connected by conductors which have not been illustrated.

A Zener diode 96 is connected between conductor 94 and ground as is a capacitor 98. The Zener diode 96 and capacitor 98, together with resistor 92, form a transient suppression circuit.

Two of the phase leads that are connected to the output winding 12 and the bridge rectifier 26 are connected respectively to conductors 100 and 102 The conductor 100 is connected to a junction $P_A$ while conductor 102 is connected to junction $P_B$. There are other junctions shown in FIG. 1 which are identified as $P_A$ and $P_B$ and all of these junctions are electrically connected by conductors which have not been illustrated.

The dual voltage system of this invention can operate in either a so-called 12 volt mode or a so-called 24 volt mode, depending upon the speed of the generator. The system operates in the so-called 12 volt mode when generator speed is, for example, below 2800 rpm. This may correspond to an engine speed of about 900 rpm due to the speed ratio provided by the belt and pulley arrangement that connects the engine 16 and the rotor of the generator. At generator speeds above 2800 rpm the system operates in the 24 volt mode.

When the system is operating in the 12 volt mode the groups of controlled rectifiers are alternately and sequentially gated conductive. Thus, the sequence is such that, for example, controlled rectifiers 50-54 are gated conductive, then controlled rectifiers 60-64 are gated conductive, and then controlled rectifiers 50-54 are once again gated conductive and so on. The time period that a given group of controlled rectifiers is gated conductive is dependent upon the relative magnitudes of the voltages across batteries 38 and 42 and the manner in which this is achieved will be described hereinafter.

When the system is operating in the 24 volt mode the system will charge batteries 38 and 42 in series using bridge rectifier diodes 28 and 30 and will also select one or the other of the two groups of controlled rectifiers to provide additional charge to whichever battery is subjected to a heavier load. The system operates by comparing the relative magnitudes of the voltages across batteries 38 and 42 and then operates to cause a group of controlled rectifiers to be conductive that will cause charging of the battery that has the lower voltage. By way of example, if the voltage across battery 42 is lower than the voltage across battery 38 the system will operate to cause controlled rectifiers 50-54 to be biased conductive. The manner in which this is accomplished will be more fully described hereinafter.

In order to provide a speed signal for selecting the mode of operation, the system responds to the voltages at junctions $P_A$ and $P_B$. The alternating voltages at these junctions has a frequency which is a function of generator speed. The junctions $P_A$ and $P_B$ are connected to junctions 104 and 106 through resistors and these junctions are in turn connected to the input terminals of an operational amplifier 108. The junctions 106 and 104 are connected to voltage divider resistors 110 which typically have equal resistance values. The output of the amplifier 108 is applied to a frequency to voltage converter 112 via capacitor 114 and conductor 116. The voltage on conductor 116 is an alternating voltage which has a frequency corresponding to generator speed. The frequency to voltage converter 112 may be a type LM 2917 device. The frequency to voltage converter includes a charge pump circuit 118, a voltage comparator 120 and an NPN transistor 122. The frequency to voltage converter further includes capacitors 124 and 126 and a resistor 130. The frequency to voltage converter causes a direct voltage to be developed in a known manner on conductor 132 which is a function of the frequency of the output voltage of the output winding 12 and hence a direct voltage that is a function of generator speed. This direct voltage is applied to the positive terminal of the voltage comparator 120. The negative terminal of the voltage comparator is connected to a wiper 134 of a variable resistor 136 via conductor 137. The variable resistor 136 forms part of a voltage divider 138 that is connected between junction 135, a reference Zener diode $V_R$, and ground. The voltage comparator 120 compares the speed related direct voltage on conductor 132 with a reference voltage at the wiper 134 of resistor 136. When the speed related voltage on conductor 132 exceeds the reference voltage on wiper 134 the output of the comparator 120 goes high to thereby bias transistor 122 conductive. When the speed related voltage on conductor 132 is less than the reference voltage at wiper 134 the output of the voltage comparator 120 goes low thereby causing the transistor 122 to be biased nonconductive.

The emitter of transistor 122 is connected to ground and its collector is connected to a conductor 140. Therefore, when transistor 122 is biased conductive the voltage on conductor 140 goes to a low logic state and when transistor 122 is nonconductive the voltage on conductor 140 goes to a high level logic state. Thus, when generator speed is below 2800 rpm the transistor 122 is biased nonconductive thereby causing a high logic level voltage to be developed on conductor 140. When engine speed is above the predetermined value of 2800 rpm the transistor 122 is biased conductive thereby causing the voltage on conductor 140 to go to a low logic level near ground potential. The logic level of the voltage on conductor 140 will determine whether the system will operate in the 12 volt mode or in the 24 volt mode.

The system has an operational error amplifier 142 which develops an output voltage that is a function of the relative magnitudes of the voltages across batteries 38 and 42. The positive terminal of the error amplifier 142 is connected to a junction 144 located between resistors 146 and 148. The resistors 146 and 148 may have equal values of approximately 20K ohms. One end of the resistor 146 is connected to junction $V_B$ and accordingly to junction 40. The voltage between junction 40 and ground is therefore applied across resistors 146 and 148. The voltage at junction 144 therefore will be one-half the voltage at junction 40 and assuming that the voltage at junction 40 is 12 volts the voltage at junction 144 would be 6 volts.

The negative terminal of the error amplifier 142 is connected to a wiper or slider 149 of a variable resistor 150. The variable resistor is connected in series with voltage divider resistors 152 and 154. The resistor 152 may be, for example, 33K ohms and the resistor 154 10K ohms. The resistance of the variable resistor 150 may be approximately 2K ohms. The resistors 152, 150 and 154 are connected between junction $V_A$ and ground and accordingly the voltage between conductor 32 and ground is applied across resistors 152, 150 and 154. Thus, in a 12/24 volt system 24 volts is applied across these resistors. The system is arranged such that when the voltages across batteries 38 and 42 are substantially equal the voltage applied to the negative terminal of the error amplifier 142 will be approximately 6 volts or in other words equal to the voltage at junction 144. Fundamentally, the voltage divider comprised of resistors 152, 150 and 154 develops a voltage that is related to one-quarter of the voltage appearing between conductor 32 and ground. The error amplifier 142 develops an output voltage on conductor 156 which is a function of the difference in the voltages applied to its input terminals.

The output voltage of the error amplifier 142 on conductor 156 is applied to the negative input terminal of voltage comparator 158 and to the positive input terminals of voltage comparators 160 and 162 via conductor 164. A voltage divider comprised of series connected resistors 166, 168 and 170 is connected between junction $V_F$ and ground so that the voltage between junction $V_F$ and ground is applied across these resistors. This voltage divider has junctions 172 and 174 which are respectively connected to the negative input terminal of voltage comparator 160 and the positive input terminal of voltage comparator 158. By way of example, resistor 166 may be 47K ohms, resistor 168 3.6K ohms and resistor 170 47K ohms.

One end of a variable resistor 176 is connected to conductor 156. The opposite end of this resistor is connected to junction $V_F$ via resistor 178. The slider of the variable resistor 176 is connected to conductor 180 which in turn is connected to the negative input terminal of a voltage comparator 182. As will be more fully described hereinafter the resistor 176 develops a dead zone voltage.

The system of this invention has a triangular voltage waveform generator which is generally designated by reference numeral 190. This triangular voltage waveform generator includes a voltage comparator 192 and a capacitor 194. This waveform generator is energized from a junction or terminal $V_F$ and develops an output voltage on conductor 196 which is applied to the positive input terminal of the voltage comparator 182 and to the negative input terminal of the voltage comparator 162 via line 198. The triangular voltage that is developed by the circuit that has just been described and which is applied to conductor 196 is illustrated in FIG. 2A where it is identified by reference numeral 200. The frequency of the triangular voltage may be about 25 Hz.

As has been previously mentioned, the logic level of the voltage on conductor 140 determines whether the system will operate in the 12 volt mode or the 24 volt mode and the logic circuitry for accomplishing this will now be described. The voltage on conductor 140 is applied to the input of a NAND gate 202 and is applied to the inputs of NAND gates 204 and 206 via conductor 208. The NAND gate 202 operates as a logic inverting NAND gate and has an output which is applied to inputs of NAND gates 210 and 212. The output of NAND gate 212 as well as the output of NAND gate 204 are applied to NAND gate 214. The output of NAND gate 214 is applied to the input of an inverter-driver 216 and its output is connected to the base of transistor 84. The output of NAND gate 210 and the output of NAND gate 206 are connected as inputs to NAND gate 218. The output of NAND gate 218 is applied as an input to an inverter-driver 220. The output of the inverter-driver 220 is connected to the base of transistor 86.

When the output of NAND gate 214 is high the output of inverter-driver 216 is low and transistor 84 is biased conductive to gate controlled rectifiers 50-54 conductive. When the output of NAND gate 214 is low the output of inverter-driver 216 is high thereby biasing transistor 84 nonconductive to terminate the gate drive signal to controlled rectifiers 50-54. In a similar fashion when the output of NAND 218 is high the output of inverter 220 is low and transistor 86 is biased conductive to gate controlled rectifiers 60-64 conductive. When the output of NAND gate 218 is low the output of inverter 220 is high thereby biasing transistor 86 nonconductive to terminate the gate drive signal to controlled rectifiers 60-64.

The output of voltage comparator 182 is connected to an input of NAND gate 204 by conductor 230. The voltage on conductor 230 is illustrated in FIG. 2B. The output of voltage comparator 162 is connected to an input of NAND gate 206 by conductor 232. The voltage on conductor 232 is illustrated in FIG. 2C.

The output of voltage comparator 160 is connected to an input of NAND gate 210 and the output of voltage comparator 158 is connected to an input of NAND gate 212.

During operation of the system, voltage comparators 182, 162, 160 and 158 develop output voltages (high or low logic levels) in accordance with the relative magnitudes of the input voltages applied to the inputs of these comparators. The NAND gate logic that has been described operates such that when the system is operating in the 12 volt mode (low engine and generator speed) the outputs of comparators 182 and 162 control the switching of transistors 84 and 86 and the outputs of comparators 160 and 158 have no effect on the switching of transistors 84 and 86. Putting it another way, the outputs of comparators 182 and 162 control the switching of transistors 84 and 86 and the outputs of comparators 160 and 158 are ignored. On the other hand, when the system is operating in the 24 volt mode (generator speed above a predetermined speed) the output voltages of comparators 160 and 158 control the switching of transistors 84 and 86 and the output voltages of comparators 182 and 162 have no effect on the switching of transistors 84 and 86. As previously mentioned, the system is set to operate in the 12 volt mode at generator speeds below 2800 rpm and in the 24 volt mode at generator speeds above 2800 rpm. The logic that has been described responds to the high or low logic level voltage on conductor 140 to set the system into either the 12 volt mode or the 24 volt mode.

The operation of the system will now be described with the assumption that the system is set to operate in the 12 volt mode. It will be further assumed that the voltage across battery 42 is lower than the voltage across battery 38. Under this condition of operation the positive terminal of comparator 182 compares the triangular voltage 200 (FIG. 2A) with a direct voltage level identified as 240 in FIG. 2A. FIG. 2A also illustrates a direct voltage level 242. The direct voltage level 242 represents the output voltage of error amplifier 142 which is applied to conductors 156 and 164. The voltage level 240 represents a voltage that is the sum of voltage 242 and the dead zone voltage developed by variable resistor 176. The comparator 162 compares the triangular voltage 200 with the error voltage level 242.

FIGS. 2B and 2C depict respectively the voltages on conductors 230 and 232 under the assumed conditions that the system is operating in the 12 volt mode and that the voltage across battery 42 is lower than the voltage across battery 38. FIG. 2D illustrates the battery charging currents for batteries 42 and 38 during the assumed conditions of operation.

Referring now to FIG. 2A, when the triangular voltage 200 exceeds voltage level 240 at point 244 the output voltage of comparator 182 goes high to develop the voltage 246 shown in FIG. 2B. When the triangular voltage 200 goes below voltage level 240 at point 248 the output voltage 246 of comparator 182 goes low. During the time that the square wave voltage 246 is high the controlled rectifiers 50-54 are gated conductive and accordingly battery charging current is supplied to battery 42 as depicted in FIG. 2D for the duration of the square wave voltage 246.

When triangular voltage 200 drops below voltage level 242 at point 250 the output voltage of comparator 162 goes high to develop the voltage 252 shown in FIG. 2C. Between the trailing edge of voltage 246 and the leading edge of voltage 252 a so-called dead zone is provided in which neither groups of controlled rectifiers are biased conductive. This ensures that one group of controlled rectifiers has turned off before the next group is triggered conductive. When triangular voltage 200 exceeds the voltage level 242 at point 254 the output voltage 252 of comparator 162 goes low as shown in FIG. 2C. During the time period that square voltage 252 is high, which corresponds to its pulse width, controlled rectifiers 60-64 are gated conductive and accordingly battery 38 is supplied with charging current for a time period corresponding to the pulse width of voltage 252 as depicted in FIG. 2D.

From the foregoing description it will be evident that the system provides constant frequency variable pulse width control of battery charging current. Moreover, the relative time periods or pulse widths that battery charging current is supplied to the batteries is a function of the difference in the voltages across the batteries.

Figure 2:
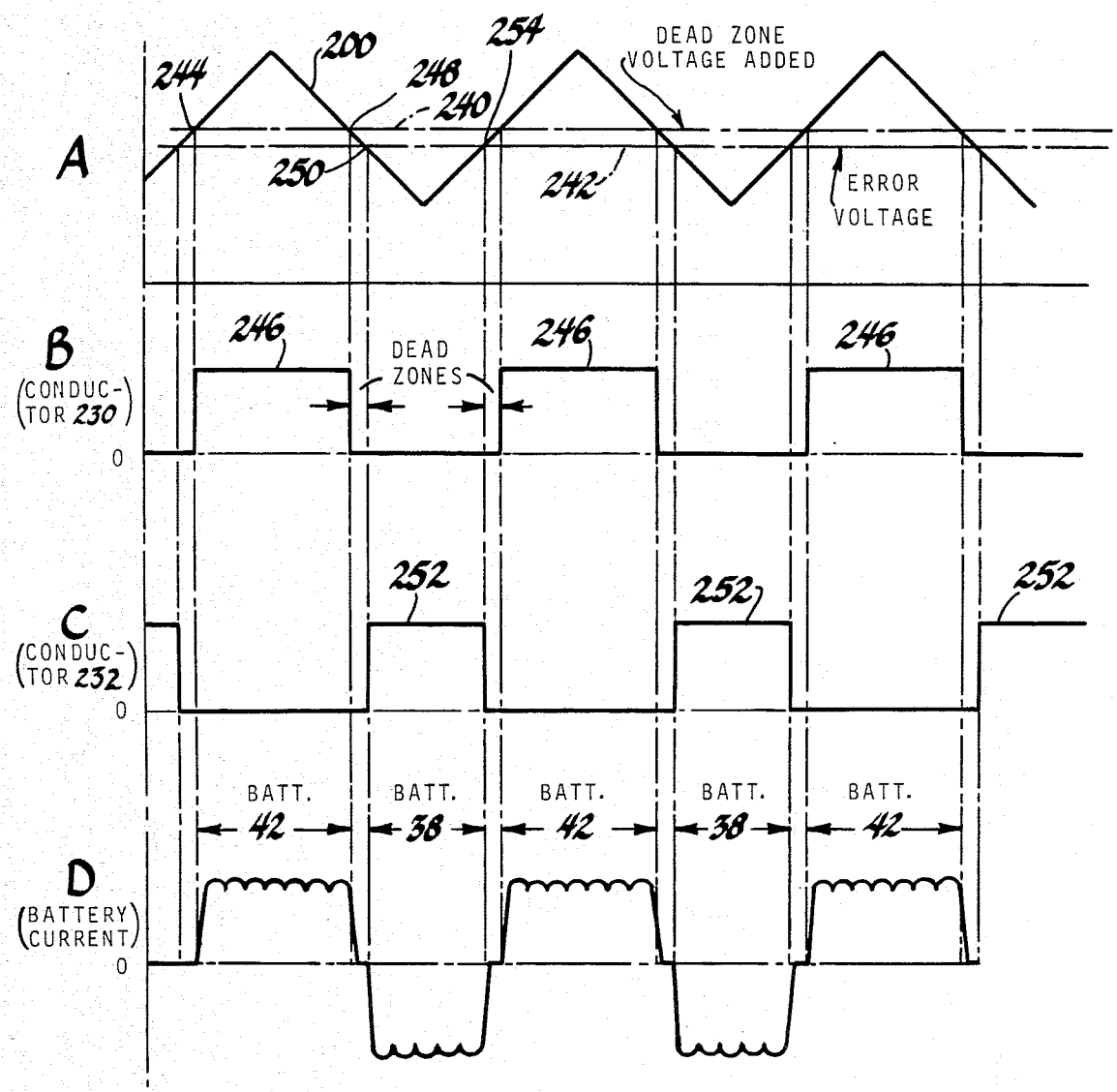
FIGS. 2A-2D illustrates various waveforms of voltages and currents that relate to the system illustrated in FIG. 1.

The waveforms of FIG. 2 depict the condition of operation in which the voltage across battery 42 is lower than the voltage across battery 38 and under this condition of operation battery 42 is supplied with charging current for longer periods of time than periods of time that battery 38 is charged. The voltage level 242 shifts in response to the difference in the voltages across batteries 38 and 42. In a condition of operation in which the voltage across battery 38 is lower than the voltage across battery 42 the voltage level 242 shifts upward in FIG. 2A to a point where battery 38 would be supplied with current for a longer time period than battery 42. In other words, the pulse width of voltage 246 would shorten and the voltage pulse 252 would get longer.

If the voltages across batteries 38 and 42 are substantially equal (balanced load condition) the system operates such that the time duration of voltage 246 and 252 are substantially equal with the result that the time periods that the batteries 38 and 42 are supplied with charging current will be substantially equal, that is the two groups of controlled rectifiers will be alternately and consecutively gated conductive for substantially equal time periods.

If it is now assumed that generator speed is above the switch point speed of about 2800 rpm, the system will be set to operate in the 24 volt mode. In the 24 volt mode the outputs of comparators 182 and 162 no longer control the system and the outputs of comparators 160 and 158 assume control of the system. The comparator 160 compares the voltage at junction 172 with the output voltage of error amplifier 142 and the comparator 158 compares the voltage at junction 174 with the output voltage of error amplifier 142. As pointed out previously, resistors 166, 168 and 170 may be respectively 47K ohms, 3.6K ohms and 47K ohms. Assuming these resistance values and assuming that the voltage at junction $V_F$ is 12 volts the voltage at junction 172 would be about 6.3 volts and the voltage at junction 174 about 5.8 volts. Thus, the voltage at junction 172 is slightly higher than the voltage of junction 174 due to the voltage divider ratios provided by series connected resistors 166, 168 and 170.

If it is assumed now that the voltage across battery 42 is sufficiently higher than the voltage across battery 38 to produce an output voltage from amplifier 142 that is higher in voltage than the voltage of junction 172 the output voltage of comparator 160 will go high which will in turn cause transistor 86 to be biased conductive. The conduction of transistor 86 will cause controlled rectifiers 60-64 to be biased conductive and accordingly charging current will be supplied to battery 38 via conducting controlled rectifiers 60-64. At this time the output voltage of error amplifier 142 is higher than the voltage at junction 174 and accordingly the output voltage of comparator 158 is low. This causes the transistor 84 to be biased nonconductive with the result that controlled rectifiers 50-54 are not biased conductive. As long as the voltage across battery 42 is higher than the voltage across battery 38 controlled rectifiers 60-64 are biased conductive and controlled rectifiers 50-54 are nonconductive.

If conditions change such that the voltage across battery 38 is now higher than the voltage across battery 42 the output voltage of error amplifier 142 will go lower than the voltage at junction 174 and lower than the voltage at junction 172. Accordingly, the output of comparator 160 will go low and the output of comparator 158 will go high. This will cause transistor 84 to be biased conductive and transistor 86 nonconductive with the result that controlled rectifiers 50-54 are biased conductive and controlled rectifiers 60-64 are nonconductive. Battery 42 is now charged via conductive controlled rectifiers 50-54.

When the voltages across batteries 38 and 42 are substantially equal the output voltage of error amplifier 142 is intermediate the voltages of junctions 172 and 174 and accordingly the outputs of both comparators 160 and 158 are low. Because of this, neither group of controlled rectifiers is biased conductive but battery charging can still take place through diode bridge rectifier 26.

The slight voltage difference of junctions 172 and 174 provides a dead band or zone. This ensures that one group of controlled rectifiers has turned off before the other group is triggered conductive.

By way of example, and not by way of limitation, the following types of semiconductor circuit elements can be utilized as components of the system shown in FIG. 1.

| Component | Type |
|---|---|
| Comparators 182, 162, 160, 158 and amplifiers 108 and 142 | MC 3403 |
| V to F converter 112 | LM 2917 |
| NAND gates 204, 206, 210, 212, 214 and 218 | MC 14023B |
| NAND gate 202 | MC 14011B |
| Buffer Inverters 216 and 220 | ULN 2004 |

The stator winding 12 is wound as a 12 volt stator winding which could be either Wye or Delta connected and has resistance and reactance that relate to a 12 volt alternating current generator.

The following is a list of significant advantages of this invention.

1. The system provides for balanced battery voltages over the entire engine operating speed range.
2. The system provides for balanced battery voltages with unbalanced loading over the entire engine operating speed range.
3. Since the stator 12 of the alternating current generator has the characteristics of a 12 volt stator, stator winding power loss is significantly reduced when generating the same power at 24 volts (higher engine speeds).
4. Because of the preceding advantage, this system enables the alternator to deliver more power for a fixed alternator size than an equivalent single battery system.

It should be noted that the reason for utilizing the 12 volt mode is that at low engine speeds the alternating current generator cannot generate sufficient 24 volt power. In this regard, an alternator can provide more output power into a higher voltage battery at higher alternator speed. Consequently, in the dual voltage system of this invention it is possible to take advantage of this fact and provide 12 volt charging up to a predetermined generator speed (2800 rpm) where more output power can be generated into 24 volts.

In the description of this invention the semiconductor switches that are gated on and off have been disclosed as being groups of controlled rectifiers 50-54 and 60-64. These semiconductor switches could take forms other than controlled rectifiers, for example bipolar transistors. Thus, for example three diodes connected in series with a semiconductor switch such as a transistor could be substituted for a group of controlled rectifiers.

The groups of controlled rectifiers 50–54 and 60–64 form what may be termed a switchable rectifying circuit since they provide a rectifying function as well as a switching or switchable function since they are biased conductive and nonconductive.

The batteries 38 and 42 can be two separate batteries or can take the form of a single 24 volt battery provided in a single case or package that would have a positive terminal corresponding to junction 36, a negative terminal corresponding to the negative terminal of battery 42 and an intermediate terminal corresponding to junction 40.

The embodiments of the invention in which an exclusive property or privilege is claimed are defined as follows:

1. A dual voltage motor vehicle electrical system comprising, an alternating current generator having a polyphase output winding, a polyphase full-wave bridge rectifier comprised of groups of positive and negative diodes, said bridge rectifier having AC input terminals connected to said output winding and having positive and negative direct voltage output terminals, first and second storage batteries connected in series and across said direct voltage output terminals of said bridge rectifier, the negative terminal of one battery and the positive terminal of the other battery being connected to a common junction, a first switchable rectifying circuit connected between said junction and said AC input terminals, said first switchable rectifying circuit when biased conductive and one of said groups of diodes supplying charging current to one of said batteries, a second switchable rectifying circuit connected between said junction and said AC input terminals, said second switchable rectifying circuit when biased conductive and the other group of said diodes supplying charging current to the other battery, means for causing said switchable rectifying circuits to be biased alternately conductive, means for sensing the relative magnitudes of the voltages across said batteries, and means responsive to the difference in the voltages across the batteries for controlling the time periods that said switchable rectifying circuits are biased conductive, said last-named means operative to cause the switchable rectifying circuit that supplies current to the battery that has the lower voltage to be biased conductive for a time period that is longer than the time period of conduction of the other switchable rectifying circuit.

2. The electrical system according to claim 1 where the first and second switchable rectifying circuits are comprised of first and second groups of controlled rectifiers.

3. A dual voltage motor vehicle electrical system comprising, an engine for said vehicle, an alternating current generator having a polyphase output winding and a rotor that is driven by said engine, a polyphase full-wave bridge rectifier comprised of groups of positive and negative diodes, said bridge rectifier having AC input terminals connected to said output winding and having positive and negative direct voltage output terminals, first and second storage batteries connected in series and across said direct voltage output terminals of said bridge rectifier, the negative terminal of one battery and the positive terminal of the other battery being connected to a common junction, a first group of controlled rectifiers connected between said junction and said AC input terminals, said first group of controlled rectifiers when biased conductive and one of said groups of diodes supplying charging current to one of said batteries, a second group of controlled rectifiers connected between said junction and said AC input terminals, said second group of controlled rectifiers when biased conductive and the other group of said diodes supplying charging current to the other battery, means for sensing engine speed and operative when engine speed is below a predetermined value to cause said groups of controlled rectifiers to be biased alternately conductive, means for sensing the relative magnitudes of the voltages across said batteries, and means responsive to the difference in the voltages across the batteries for controlling the time periods that said groups of controlled rectifiers are biased conductive, said last-named means operative to cause the group of controlled rectifiers that supplies current to the battery that has the lower voltage to be biased conductive for a time period that is longer than the time period of conduction of the other group of controlled rectifiers.

4. The electrical system according to claim 3 where the means for sensing engine speed comprises means that is responsive to the frequency of the alternating voltage generated in said output winding.

5. A dual voltage motor vehicle electrical system comprising, an engine for said vehicle, an alternating current generator having a polyphase output winding and a rotor that is driven by said engine, a polyphase full-wave bridge rectifier comprised of groups of positive and negative diodes, said bridge rectifier having AC input terminals connected to said output winding and having positive and negative direct voltage output terminals, first and second storage batteries connected in series and across said direct voltage output terminals of said bridge rectifier, the negative terminal of one battery and the positive terminal of the other battery being connected to a common junction, a first switchable rectifying circuit connected between said junction and said AC input terminals, said first switchable rectifying circuit when biased conductive and one of said groups of diodes supplying charging current to one of said batteries, a second switchable rectifying circuit connected between said junction and said AC input terminals, said second switchable rectifying circuit when biased conductive and the other group of said diodes supplying charging current to the other battery, means including speed sensing means for sensing engine speed and operative when engine speed is below a predetermined value to cause said switchable rectifying circuits to be biased alternately conductive, means for sensing the relative magnitudes of the voltages across said batteries, means responsive to the difference in the voltages across the batteries for controlling the time periods that said switchable rectifying circuits are biased conductive, said last-named means operative to cause the switchable rectifying circuit that supplies current to the battery that has the lower voltage to be biased conductive for a time period that is longer than the time period of conduction of the other switchable rectifying circuit, and control means coupled to said speed sensing means and operative when engine speed is above said predetermined value for disabling said means for causing said switchable rectifying circuits to be alternately conductive, said system including means operative when said means for causing said switchable rectifying circuits to be biased alternately conductive is disabled for causing a switchable rectifying circuit that supplies current to the battery that has the lower voltage to be biased conductive.

6. A dual voltage motor vehicle electrical system comprising, an engine for said vehicle, an alternating current generator having a polyphase output winding and a rotor that is driven by said engine, a polyphase full-wave bridge rectifier comprised of groups of positive and negative diodes, said bridge rectifier having AC input terminals connected to said output winding and having positive and negative direct voltage output terminals, first and second storage batteries connected in series and across said direct voltage output terminals of said bridge rectifier, the negative terminal of one battery and the positive terminal of the other battery being connected to a common junction, a first group of controlled rectifiers connected between said junction and said AC input terminals, said first group of controlled rectifiers when biased conductive and one of said groups of diodes supplying charging current to one of said batteries, a second group of controlled rectifiers connected between said junction and said AC input terminals, said second group of controlled rectifiers when biased conductive and the other group of said diodes supplying charging current to the other battery, voltage sensing means for sensing the relative magnitudes of the voltages across said batteries, and control means for sensing engine speed and operative when engine speed is above a predetermined value for causing the group of controlled rectifiers that supplies current to the battery that has the lower voltage to be biased conductive.

7. A dual voltage motor vehicle electrical system comprising, an alternating current generator having a polyphase output winding, a polyphase full-wave bridge rectifier comprised of groups of positive and negative diodes, said bridge rectifier having AC input terminals connected to said output winding and having positive and negative direct voltage output terminals, first and second storage batteries connected in series and across said direct voltage output terminals of said bridge rectifier, the negative terminal of one battery and the positive terminal of the other battery being connected to a common junction, a first group of controlled rectifiers connected between said junction and said AC input terminals, said first group of controlled rectifiers when biased conductive and one of said groups of diodes supplying charging current to one of said batteries, a second group of controlled rectifiers connected between said junction and said AC input terminals, said second group of controlled rectifiers when biased conductive and the other group of said diodes supplying charging current to the other battery, means for causing said groups of controlled rectifiers to be biased alternately conductive, a voltage divider having a voltage divider junction connected across said batteries, error voltage developing means connected to said common junction and to said voltage divider junction for developing an error voltage the magnitude of which is a function of the difference in voltage of the voltages at said common junction and said voltage divider junction, and means responsive said error voltage for controlling the time periods that said groups of controlled rectifiers are biased conductive, said last-named means operative to cause the group of controlled rectifiers that supplies current to the battery that has the lower voltage to be biased conductive for a time period that is longer than the time period of conduction of the other groups of controlled rectifiers.

* * * * *